Dec. 27, 1927. Re. 16,839

O. J. BORK

MILKING MACHINE WASHING DEVICE

Original Filed Nov. 6, 1925

INVENTOR.
Otto J. Bork

BY Morsell, Keeney & Morsell

ATTORNEYS

Reissued Dec. 27, 1927. Re. 16,839

UNITED STATES PATENT OFFICE.

OTTO J. BORK, OF SUN PRAIRIE, WISCONSIN, ASSIGNOR TO THE UNIVERSAL MILKING MACHINE COMPANY, A CORPORATION OF WISCONSIN.

MILKING-MACHINE WASHING DEVICE.

Original No. 1,570,069, dated March 30, 1926, Serial No. 67,414, filed November 6, 1925. Application for reissue filed September 20, 1926. Serial No. 136,892.

This invention relates to a washing device for use in connection with milking machines, and has for its object to provide, in a manner as hereinafter set forth, a device of the class referred to for cleaning the lead and tit cups of a milking machine to keep them fresh and in sanitary condition.

Further objects of the invention are to provide, in a manner as hereinafter set forth, a washing device for the purpose referred to which is simple in its construction and arrangement, strong, durable, compact, thoroughly efficient and convenient in its use, and comparatively inexpensive to manufacture.

With the foregoing and other objects in view, the invention consists of a novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
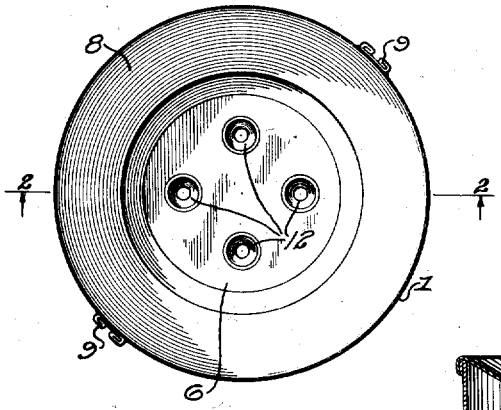
Figure 1 is a top plan view of a washing device in accordance with this invention.

Referring to the drawings in detail, a washing device in accordance with this invention, comprises a receptacle which is referred to generally by the reference character 1 and which constitutes a water container. The receptacle 1 consists of a body portion formed of an upper annular section 2, and a lower flaring section 3. The top of the section 3 is provided with a laterally extending annular flange 4 which is angle shaped in cross section and provides a seat for the bottom of the section 2, as well as overlaps the periphery of the section 2 at the bottom. The section 2 and flange 4 are suitably secured together. The lower end of the section 3 is formed with a laterally extending annular flange 5 and abutting thereagainst, as well as overlapping said flange 5 is a circular plate 6, which forms the bottom of the receptacle 1. That portion of the plate 6 which overlaps the flange 5 is indicated at 7. The flange 5 and the plate 6 can be secured together by any suitable means. Secured to and extending within the section 2 of the receptacle 1, at the top thereof, as well as depending within said section, is a top member 8, which is in the form of an annulus and which prevents splashing when water is supplied to the receptacle 1. The upper section 2 of the receptacle 1, is provided with a pair of diametrically opposed handle members 9.

Figure 2:
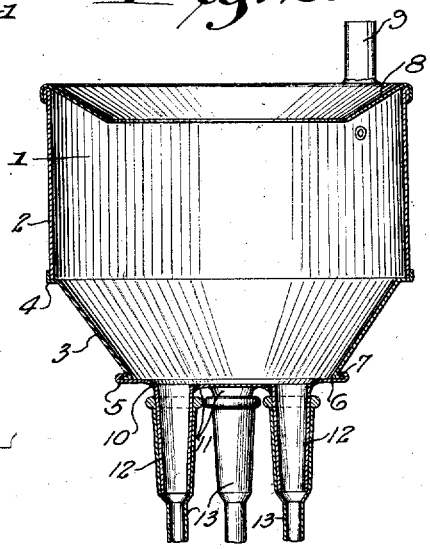
Figure 2 is a section on line 2—2, Figure 1.
Figure 3:
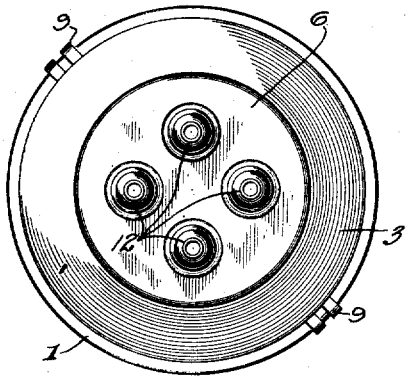
Figure 3 is an inverted plan view of the device.

The plate 6, which provides the bottom of the receptacle 1, is formed with a series of spaced openings 10 and the material surrounding each opening is offset as at 11 to provide a flaring collar and into each of said collars is extended the upper end of a tapered coupling tube 12, which is employed for connecting the lead or a tit cup to the receptacle 1 and as illustrated in Figure 2, the tubes 12 have leads 13 connected therewith and said leads are in the form of rubber tubes that extend from the tit cups to the pulsator. Each of the tubes 12 is secured at its upper end by any suitable means to the plate 6.

When the device is used, the end of each lead that is disconnected from the pail or pulsator is placed upon one of the tubes 12. Water is then supplied to the receptacle 1 and flows through the lead and tit cup and discharged at any desired point. This affords a very convenient, practical and sanitary way of cleaning the leads and keeping them fresh.

It is thought that the many advantages of a washing device, in accordance with this invention, and for the purpose referred to, can be fully understood, and although the preferred embodiment of the invention is as illustrated and described, yet it is to be understood that changes in the detail of construction can be had which will fall within the scope of the invention as claimed.

What I claim is:

1. A washing device for the purpose set forth, comprising a container adapted to have water supplied thereto and further having its bottom formed with a plurality of openings, and a tapered tube secured in and extending from each of said openings and adapted to have detachably mounted thereon the lead of a milking machine for the purpose of cleaing the lead on the supply of water to the container.

2. A washing device for the purpose set forth, comprising a container adapted to have water supplied thereto and consisting of a body portion having the lower part thereof flaring, said body portion further having its bottom formed with a plurality of openings, and a coupling tube having its upper end secured in each of said openings, said tubes depending from said openings and each adapted to have detachably connected thereon a lead of a milking machine for the purpose of cleaning said lead when water is supplied to the container.

3. A washing device for the purpose set forth, comprising a container adapted to have water supplied thereto and consisting of a body portion having the lower part thereof flaring, said body portion further having its bottom formed with a plurality of openings, a coupling tube having its upper end secured in each of said openings, said tubes depending from said openings and each adapted to have detachably connected thereon a lead of a milking machine for the purpose of cleaning said lead when water is supplied to the container, and a top member mounted on and depending into said body portion and formed of an annulus providing means to prevent splashing when the water is supplied to the container.

4. A milking machine flushing device, comprising a container for the reception of liquid, the bottom of the container being provided with a plurality of openings, and tubes secured to the bottom portion and registering with said openings and extending downwardly therefrom and adapted to have detachably connected thereto the leads of a milking machine for the purpose of cleaning the leads through the passage of liquid from the container.

5. A washing device for the purpose set forth, comprising a container adapted to have water supplied thereto and consisting of a body portion having the lower portion thereof downwardly and inwardly tapered, an inwardly and downwardly tapered top member mounted on and depending into said body portion and having an opening therein, said body portion having its bottom formed with a plurality of openings, and coupling tubes depending from said bottom and in register with said openings, said tubes being adapted to have detachably connected thereto the leads of a milking machine for the purpose of cleaning said leads when water is supplied to the container.

This specification signed this 11th day of Sept. 1926, at Sun Prairie, Wisconsin.

OTTO J. BORK.